(12) United States Patent
Gilbert-Eyres et al.

(10) Patent No.: US 12,441,342 B2
(45) Date of Patent: Oct. 14, 2025

(54) SYSTEM AND METHOD FOR MAINTAINING SENSOR DATA OF A VEHICLE

(71) Applicant: GM Global Technology Operations LLC, Detroit, MI (US)

(72) Inventors: Matthew Edward Gilbert-Eyres, Rochester Hills, MI (US); Craig Thomas Douglas, Pflugerville, TX (US); Alec M. Wuorinen, Columbus, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 110 days.

(21) Appl. No.: 18/406,101

(22) Filed: Jan. 6, 2024

(65) Prior Publication Data
US 2025/0222944 A1 Jul. 10, 2025

(51) Int. Cl.
*B60W 50/08* (2020.01)

(52) U.S. Cl.
CPC ....... *B60W 50/08* (2013.01); *B60W 2420/403* (2013.01); *B60W 2420/408* (2024.01); *B60W 2510/10* (2013.01); *B60W 2554/4041* (2020.02); *B60W 2756/10* (2020.02)

(58) Field of Classification Search
CPC ........... B60W 50/08; B60W 2420/403; B60W 2420/408; B60W 2510/10; B60W 2554/4041; B60W 2756/10
USPC ...................................................... 701/467
See application file for complete search history.

(56) References Cited

U.S. PATENT DOCUMENTS

| | | | |
|---|---|---|---|
| 11,618,439 B2 * | 4/2023 | Magzimof | B60W 30/146 701/2 |
| 2021/0215491 A1 * | 7/2021 | Liu | G06Q 50/40 |
| 2021/0287548 A1 * | 9/2021 | Lai | B60R 1/025 |
| 2022/0392336 A1 * | 12/2022 | Gaither | G08G 1/08 |
| 2023/0129223 A1 * | 4/2023 | Svensson | G01S 17/87 701/23 |
| 2024/0274015 A1 * | 8/2024 | Putney | G08G 1/22 |

FOREIGN PATENT DOCUMENTS

| | | |
|---|---|---|
| DE | 102020103673 A1 | 8/2020 |
| DE | 102020103509 A1 | 10/2020 |
| DE | 102022106617 A1 | 10/2022 |

* cited by examiner

*Primary Examiner* — Muhammad Shafi
(74) *Attorney, Agent, or Firm* — Honigman LLP; Matthew H. Szalach; Jonathan P. O'Brien

(57) ABSTRACT

A computer-implemented method that, when executed by data processing hardware, cause the data processing hardware to perform operations. The operations include establishing a map of one or more support vehicles adjacent to a host vehicle, determining available sensor support of the one or more support vehicles, storing the available sensor support in memory hardware connected to the host vehicle, determining whether there has been a change in a gear status of the host vehicle, receiving sensor data from the one or more support vehicles, and maintaining sensor data of the host vehicle with the sensor data of the one or more support vehicles based on the gear status of the host vehicle.

14 Claims, 5 Drawing Sheets

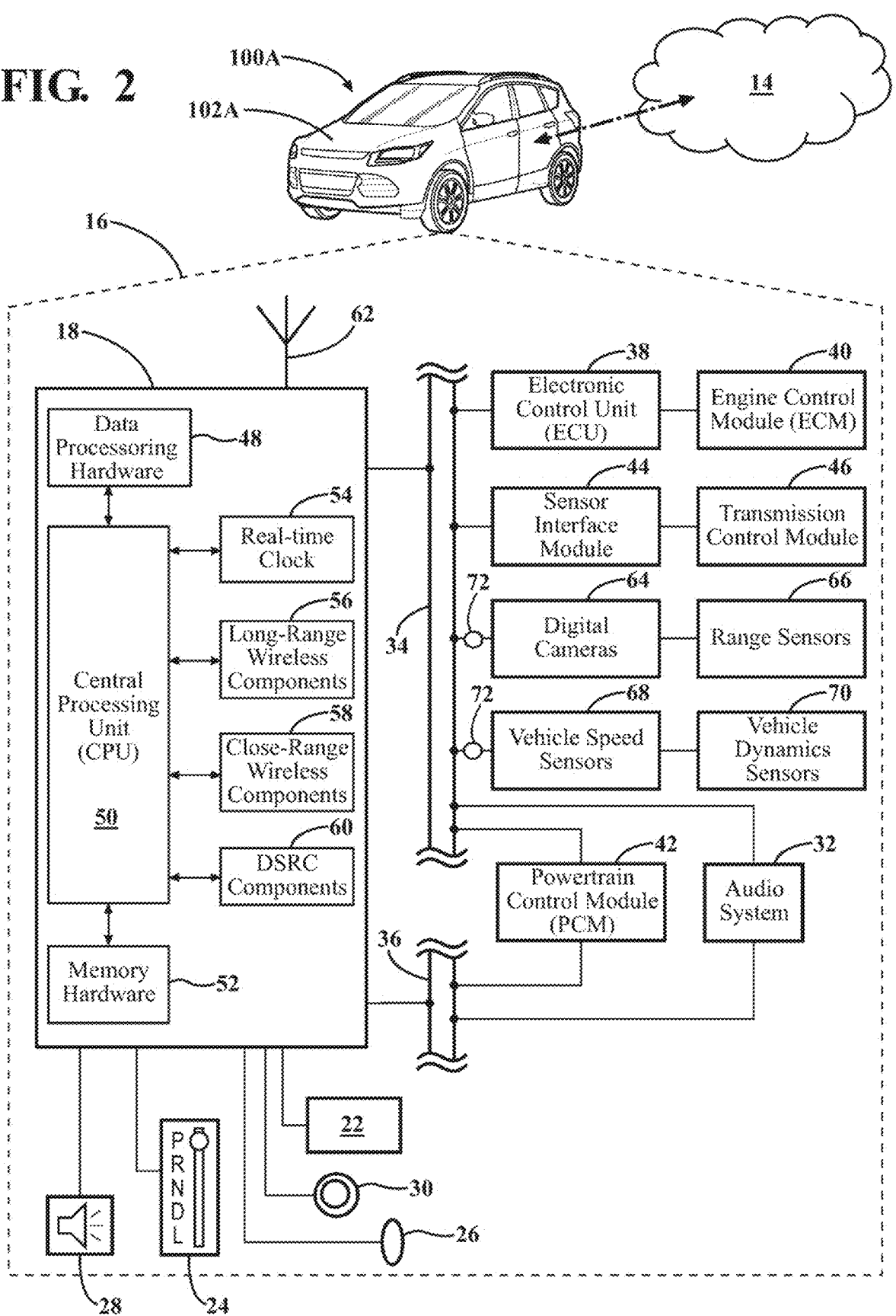

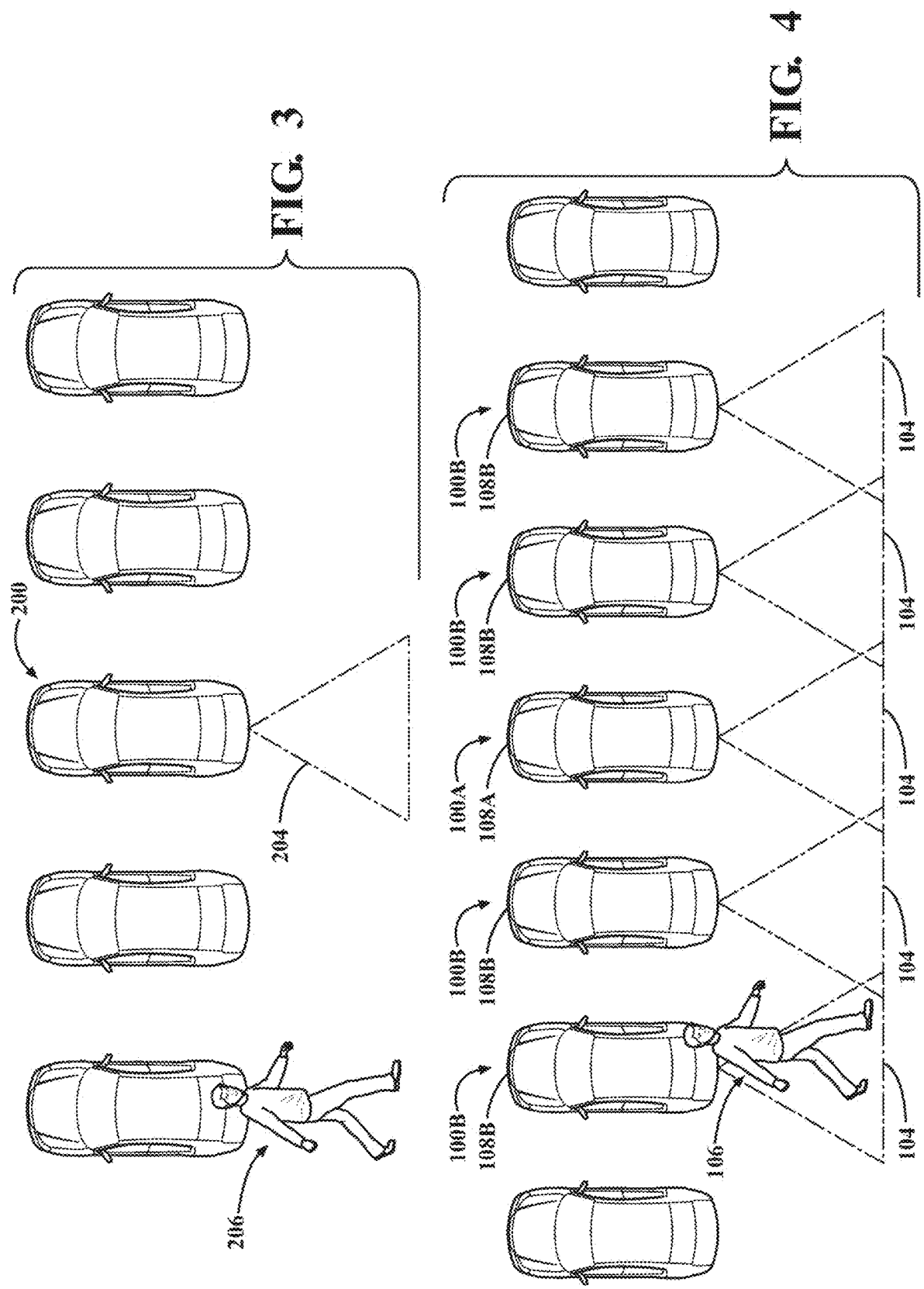

SYSTEM AND METHOD FOR MAINTAINING SENSOR DATA OF A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for maintaining sensor data of a vehicle, and more particularly, to a system and method for maintaining sensor data of a host vehicle with sensor data of one or more support vehicles.

Existing vehicles are equipped with sensor systems that provide data to one or more operating systems of the vehicle. These sensor systems commonly include one or more sensors configured on an interior and an exterior of the vehicle. Objects such as buildings, signs, or other vehicles may obstruct the one or more sensors of the vehicle and affect their ability to provide information that may be desirable for the operating system or an operator of the vehicle. These shortcomings of existing vehicles may be addressed by maintaining sensor data of a host vehicle with sensor data of one or more support vehicles that are positioned within an operating region of the host vehicle.

SUMMARY

In one configuration, a computer-implemented method that, when executed by data processing hardware, causes the data processing hardware to perform operations is provided. The operations include establishing a map of one or more support vehicles adjacent to a host vehicle, determining available sensor support of the one or more support vehicles, storing the available sensor support in memory hardware connected to the host vehicle, determining whether there has been a change in a gear status of the host vehicle, receiving sensor data from the one or more support vehicles, and maintaining sensor data of the host vehicle with the sensor data of the one or more support vehicles based on the gear status of the host vehicle.

The method may include one or more of the following optional aspects or steps. For example, establishing a map of the one or more support vehicles may include querying the one or more support vehicles using one or more vehicle communication networks. Determining the available sensor support of the one or more support vehicles may include identifying a heading of each of the one or more support vehicles, determining camera viewpoints of each of the one or more support vehicles, and determining radar coverage of each of the one or more support vehicles. Establishing a map of the one or more support vehicles may include calculating an angle between a heading of the host vehicle and the heading of each of the one or more support vehicles to determine a relative position of each of the one or more support vehicles and the host vehicle. The memory hardware connected to the host vehicle may be a cloud-based memory system. The method may further include the steps of maintaining a connection with the one or more support vehicles and waking up the one or more support vehicles from a sleep mode when there has been a change in gear status of the host vehicle. Maintaining the sensor data of the host vehicle may include continuously receiving data from the one or more support vehicles as the host vehicle changes position with respect to the one or more support vehicles.

In another configuration, a system is provided and includes data processing hardware and memory hardware in communication with the data processing hardware, the memory hardware storing instructions that, when executed on the data processing hardware, cause the data processing hardware to perform operations. The operations include establishing a map of one or more support vehicles adjacent to a host vehicle, determining available sensor support of the one or more support vehicles, storing the available sensor support in the memory hardware connected to the host vehicle, determining whether there has been a change in a gear status of the host vehicle, receiving sensor data from the one or more support vehicles, and maintaining sensor data of the host vehicle with the sensor data of the one or more support vehicles based on the gear status of the host vehicle.

The system may include one or more of the following optional aspects. For example, establishing a map of the one or more support vehicles may include querying the one or more support vehicles using one or more vehicle communication networks. Determining the available sensor support of the one or more support vehicles may include identifying a heading of each of the one or more support vehicles, determining camera viewpoints of each of the one or more support vehicles, and determining radar coverage of each of the one or more support vehicles. Establishing a map of the one or more support vehicles may include calculating an angle between a heading of the host vehicle and the heading of each of the one or more support vehicles to determine a relative position of each of the one or more support vehicles and the host vehicle. The memory hardware connected to the host vehicle may be a cloud-based memory system. The system may further include the steps of maintaining a connection with the one or more support vehicles and waking up the one or more support vehicles from a sleep mode when there has been a change in gear status of the host vehicle. Maintaining the sensor data of the host vehicle may include continuously receiving data from the one or more support vehicles as the host vehicle changes position with respect to the one or more support vehicles.

In another configuration, a vehicle management system is provided and includes a communication system, data processing hardware, and memory hardware in communication with the data processing hardware, the memory hardware storing instructions that, when executed on the data processing hardware, cause the data processing hardware to perform operations. The operations include establishing a map of one or more support vehicles adjacent to a host vehicle, determining available sensor support of the one or more support vehicles, storing the available sensor support in memory hardware connected to the host vehicle, determining whether there has been a change in a gear status of the host vehicle, receiving sensor data from the one or more support vehicles, and maintaining sensor data of the host vehicle with the sensor data of the one or more support vehicles based on the gear status of the host vehicle.

The vehicle management system may include one or more of the following optional aspects. Determining the available sensor support of the one or more support vehicles may include identifying a heading of each of the one or more support vehicles, determining camera viewpoints of each of the one or more support vehicles, and determining radar coverage of each of the one or more support vehicles. Establishing a map of the one or more support vehicles may include calculating an angle between a heading of the host vehicle and the heading of each of the one or more support vehicles to determine a relative position of each of the one or more support vehicles and the host vehicle. The memory hardware connected to the host vehicle may be a cloud-based memory system. The vehicle management system may further include the steps of maintaining a connection with the one or more support vehicles and waking up the one or more support vehicles from a sleep mode when there has been a change in gear status of the host vehicle. Maintaining the sensor data of the host vehicle may include continuously receiving data from the one or more support vehicles as the host vehicle changes position with respect to the one or more support vehicles.

BRIEF DESCRIPTION OF THE DRAWINGS

The drawings described herein are for illustrative purposes only of selected configurations and are not intended to limit the scope of the present disclosure.

FIG. 2 is a schematic illustration of the host vehicle with a network of in-vehicle controllers, sensing devices, and communication devices for communicating with one or more support vehicles in accordance with aspects of the present disclosure;

FIG. 3 is a schematic of a sensing region of an existing vehicle;

FIG. 4 is a schematic of a sensing region of the host vehicle in accordance with aspects of the present disclosure;

Corresponding reference numerals indicate corresponding parts throughout the drawings.

DETAILED DESCRIPTION

Figure 1:
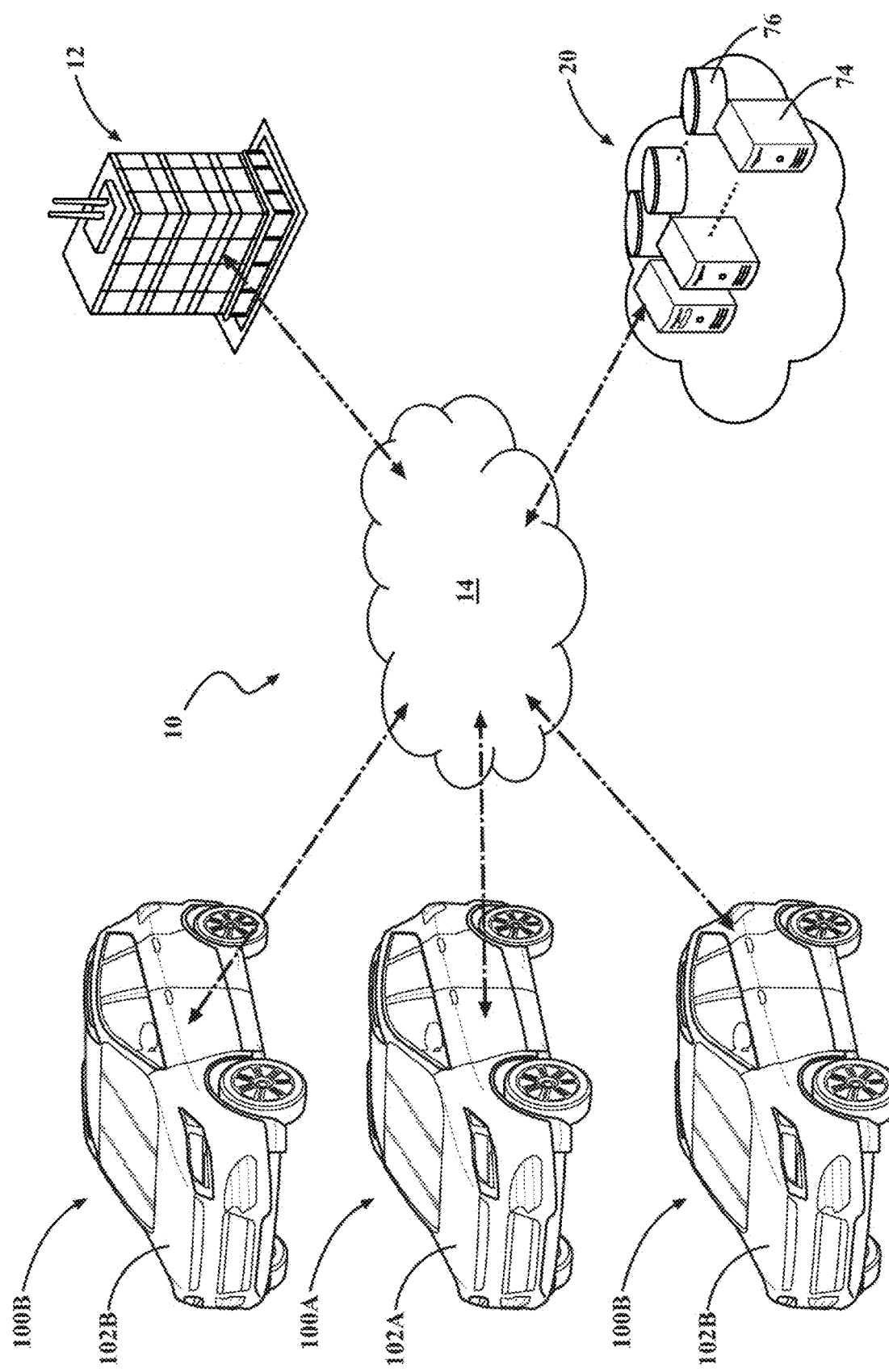
FIG. 1 is a schematic diagram of a vehicle environment including a host vehicle and one or more support vehicles according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another element, component, region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors.

The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose. coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a host vehicle 100A, one or more support vehicles 100B, and a vehicle monitoring center 12. The host vehicle 100A and one or more support vehicles 100B include a vehicle body 102A and 102B, respectively. For the sake of illustration, the vehicle operating environment 10 is shown as including a single vehicle monitoring center 12. However, in other examples, the vehicle operating environment 10 may include a plurality of vehicle monitoring centers 12 in communication with the vehicle 100 over a network 14 (e.g., the Internet, cellular networks). The vehicle monitoring center 12 may include a remote facility or system that receives and monitors diagnostic data and sensor data from the host vehicle 100A and the one or more support vehicles 100B to determine one or more vehicle operating conditions.

With reference to FIG. 2, the host vehicle 100A may be equipped with a vehicle management system 16 that includes a communication system 18 that wirelessly communicates (e.g., via cell towers, base stations, and/or mobile switching centers (MSCs), etc.) with a remotely located or off board cloud computing system 20 (FIG. 1). For the purposes of this application, the one or more support vehicles 100B may also be equipped with the same or a similar vehicle management system 16 that is described in more detail below with respect to the host vehicle 100A.

Some of the other components of the vehicle management system 16 are shown generally in FIG. 2 and include, as non-limiting examples, a display device 22, a driver interface device 24, a microphone 26, a speaker 28, and input controls 30 (e.g., buttons, knobs, switches, touchpads, keyboards, touchscreens, etc.). The components of the vehicle management system 16 may enable a user to communicate with the vehicle management system 16 and other systems and system components within the host vehicle 100A. The driver interface device 24 may include a mechanical park pawl or an electronic gear shifter comprising buttons or a dial, for example, so that an operator may change a gear status of the host vehicle 100A between park, reverse, neutral, drive, or low, for example. The microphone 26 provides a vehicle occupant with means to input verbal or other auditory commands; the host vehicle 100A may be equipped with an embedded voice-processing unit utilizing human/machine (HMI) technology. The speaker 28 provides audible output to a vehicle occupant and may be either a stand-alone speaker dedicated for use with the vehicle management system 16 or may be part of an audio system 32. The audio system 32 is operatively connected to a network connection interface 34 and an audio bus 36 to receive analog information, rendering it as sound, via one or more speaker components.

The network connection interface 34 may be communicatively coupled to the vehicle management system 16. Some examples of the network connection interface 34 may include a twisted pair/fiber optic Ethernet switch, an internal/external parallel communication bus, a local area network (LAN) interface, a controller area network (CAN), a media-oriented system transfer (MOST), a local interconnection network (LIN) interface, and the like. Other communication interfaces may also include those that conform with ISO, SAE, and IEEE standards and specifications. The network connection interface 34 enables components of the vehicle management system 16 to send and receive signals with each other and with various systems and subsystems both within or "resident" to the vehicle body 102A and outside or "remote" from the vehicle body 102A. This allows the host vehicle 100A to perform various vehicle functions, such as communicating with the one or more support vehicles 100B to maintain data onboard the host vehicle 100A. For instance, the vehicle management system 16 receives and/or transmits data to/from an electronic control unit (ECU) 38, an engine control module (ECM) 40, a powertrain control module (PCM) 42, sensor interface module(s) 44, a transmission control module 46, and assorted other vehicle ECUs, such as a brake system control module (BSCM), a climate control module (CCM), etc. In the present illustrative configuration, the driver interface device 24 is shown coupled to the communication device 18, which may communicate with (i.e., transmit data to and/or receive data from) one or more of the above modules and units 38, 40, 42, 44, 46 of the host vehicle 100A. Note, however, the driver interface device 24 may additionally or alternatively be coupled directly to the network connection interface 34 along with one or more of the modules and units 38, 40, 42, 44, 46.

With continued reference to FIG. 2, the communication system 18 is an onboard computing device that provides several functions, both individually and through its communication with other networked devices. The communication system 18 is generally composed of data processing hardware 48, each of which may be embodied as a discrete microprocessor, an application specific integrated circuit (ASIC), or a dedicated control module. The host vehicle 100A may offer centralized vehicle control via a central processing unit (CPU) 50 that is operatively coupled to memory hardware 52, each of which may take on the form of a CD-ROM, magnetic disk, IC device, semiconductor memory (e.g., various types of RAM or ROM), etc., and a real-time clock (RTC) 54. Long range vehicle communication capabilities, such as Global Network Satellite System (GNSS), with remote, off-board networked devices may be provided via one or more or all of a cellular chipset/component, a navigation and location chipset/component (e.g., global positioning system (GPS)), or a wireless modem, all of which are collectively represented at 56. Close-range wireless connectivity may be provided via a short-range wireless communication device 58 (e.g., a Bluetooth® unit or near field communications (NFC) transceiver), a dedicated short-range communication (DSRC) component 60, and/or a dual antenna 62. It should be understood that the host vehicle 100A of any one of the one or more support vehicles 100B may be implemented without one or more of the above listed components and functionality as desired for a particular end use. The various communications devices described above may be configured to exchange data as part of a periodic broadcast in a Vehicle-to-Vehicle (V2V) communication system or a vehicle-to-everything (V2X) communication system. e.g., Vehicle-to-Infrastructure (V2I), Vehicle-to-Pedestrian (V2P), and/or Vehicle-to-Device (V2D).

The CPU 50 may receive data from one or more sensing devices that use, for example, photo detection, radar, laser, ultrasonic, optical, infrared, or other suitable technology for object detection, including short range communications technologies such as DRC or Ultra-Wide Band (UWB). In accordance with the present illustrative configuration, the host vehicle 100A may be equipped with one or more digital cameras 64, one or more range sensors 66, one or more vehicle speed sensors 68, one or more vehicle dynamics sensors 70, and any requisite filtering classification, fusion and analysis hardware and software for processing raw sensor data. The digital camera 64 may use a charge coupled device (CCD) sensor or other suitable optical sensor to generate images indicating a field-of-view of the host vehicle 100A, and may be configured for continuous image generation (e.g., at least about 35 images generated per second). The range sensor 66 may emit and detect reflected radio, electromagnetic, or light-based waves (e.g., radar, EM inductive, Light Detection and Ranging (LIDAR), etc.) to detect, for example, presence, geometric dimensions, and/or proximity of an object. The vehicle speed sensor 68 may include, for example, wheel speed sensors that measure wheel speeds, which are then used to determine real-time vehicle speed. In addition, the vehicle dynamics sensor 70 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from the sensing devices 64, 66, 68, 70, the CPU 50 identifies objects within a detectable range of the host vehicle 100A, and determines attributes of the target object, such as size, relative position, angle of approach, relative speed, etc.

These sensors are distributed throughout the vehicle 10 in operatively unobstructed positions relative to respective views fore or aft or cross-car of the host vehicle 100A. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

During operation, as the sensors 64, 66, 68, 70 gather sensor data 72 within the vehicle operating environment 10, the communication system 18 may be configured to store, process, and/or communicate the sensor data 72 within the vehicle operating environment 10. The data processing hardware 48 may be configured to execute instructions stored in memory hardware 52 to perform computing tasks related to operation and management of the host vehicle 100A. Generally speaking, the communication system 18 may refer to one or more locations of data processing hardware and memory hardware. For instance, in some examples, the communication system is a local system located on the host vehicle 100A, as shown in FIG. 2. When located on the host vehicle 100A, the communication system may be centralized (i.e., in a single location/area on the host vehicle 100A, for example, within the vehicle management system 16), decentralized (i.e., located at various locations about the host vehicle 100A), or a hybrid combination of both (e.g., with a majority of centralized hardware and a minority of decentralized hardware).

Additionally or alternatively, the communication system 18 includes computing resources that are located remotely from the host vehicle 100A. For instance, the vehicle management system 16 may communicate via the network 14 with a remote vehicle computing system 20 (e.g., a remote computer/server or a cloud-based environment). Much like the vehicle management system 16, the remote vehicle computing system 20 includes computing resources such as remote data processing hardware 74 and remote memory hardware 76. Here, sensor data 72 or other processed data (e.g., data processed locally by the vehicle management system 16) may be stored in the remote vehicle computing system 20 and may be accessible by the vehicle management system 16.

Now with reference to FIG. 3, an illustration of an existing vehicle 200 comprising a sensing system is provided. In this example, the vehicle 200 is in reverse and is backing out of a parking space with vehicles positioned cross-car of the vehicle 200. A triangle is arranged behind the vehicle 200 to illustratively depict a sensing region 204 of the sensing system of the vehicle 200. As shown, a pedestrian 206 is approaching the vehicle 200 but the sensing system is unable to detect the pedestrian 206 because the pedestrian 206 is outside of the sensing region 204.

With reference to FIG. 4, the host vehicle 100A is shown in a similar scenario as that of the vehicle 200 in FIG. 3 where a pedestrian 106 is approaching. However, contrary to vehicle 200, the host vehicle 100A of the present disclosure is configured to maintain its sensor data with sensor data of one or more support vehicles 100B, thereby expanding a sensing region 104 of the host vehicle 100A to include the sensing regions 104 of the one or more support vehicles 100B. In this example, a heading 108B of the one or more support vehicles 100B is aligned with and in the same direction as a heading 108A of the host vehicle 100A. As the host vehicle 100A is reversing from a parking spot, the relevant sensor data from the one or more support vehicles 100B may include sensor data that is associated with rear sensors of any of the one or more support vehicles 100B. Thus, when the operator of the host vehicle 100A changes the gear status from park to reverse, the host vehicle 100A may either request rear sensor data from the one or more support vehicles 100B or the host vehicle 100A may maintain its sensor data with all of the sensor data of the one or more support vehicles 100B and determine which data is desirable based on the gear status. Note, however, the host vehicle 100A and one or more support vehicles 100B may communicate sensor data and requests for sensor data in other ways too. In doing so, the host vehicle 100A is able to detect the pedestrian 106 earlier than it otherwise would be by itself by utilizing sensor data received from one or more of the support vehicles 100B.

Figure 5:
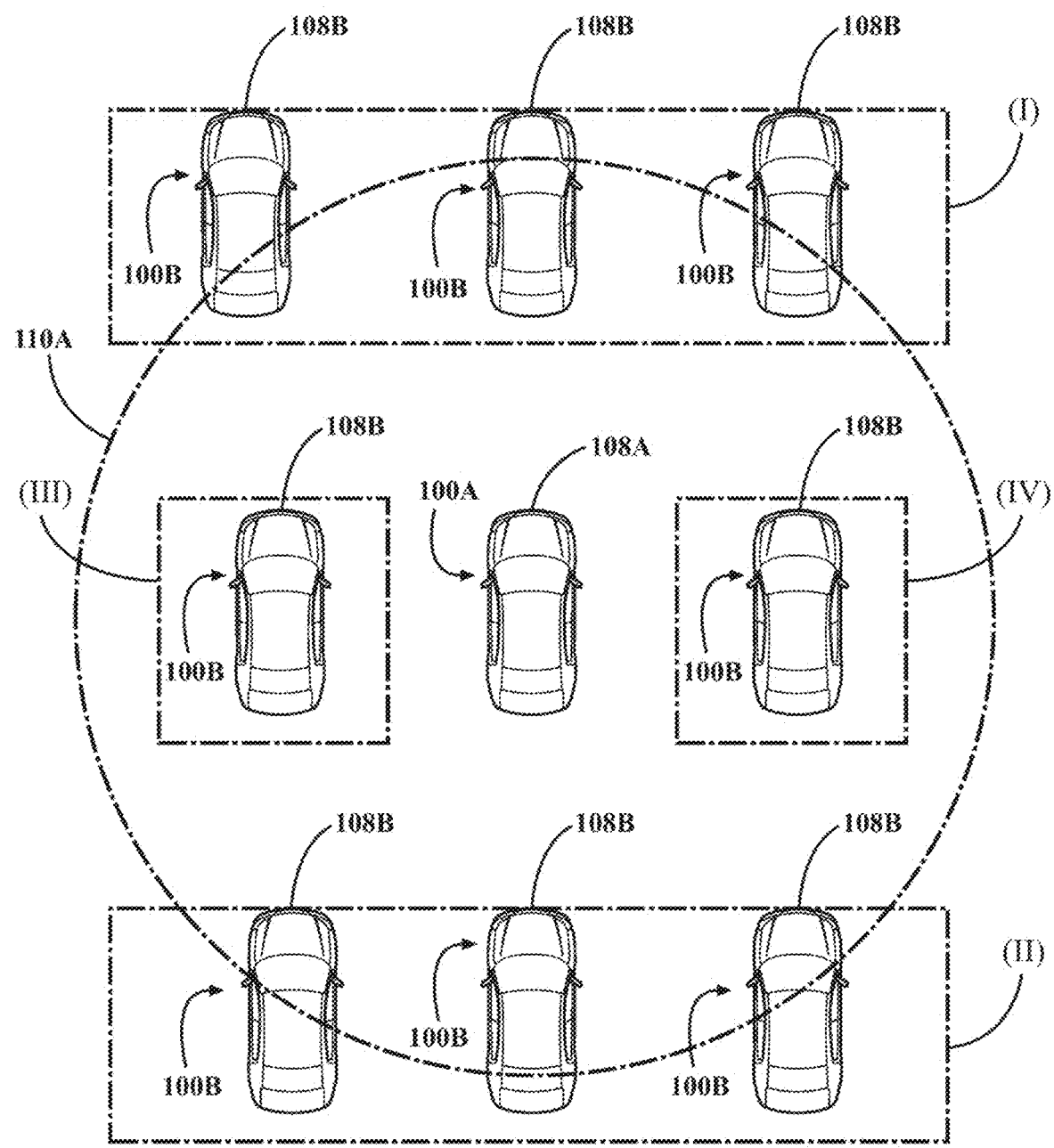
FIG. 5 is a schematic of one or more support vehicles within an operating region of the host vehicle in accordance with aspects of the present disclosure.

With reference to FIG. 5, a schematic showing the host vehicle 100A surrounded by one or more support vehicles 100B is provided. In general, the host vehicle 100A is configured to communicate with the one or more support vehicles 100B to send and receive data which identifies the position of the one or more support vehicles 100B within an operating region 110A of the host vehicle 100A. The operating region 110A is representative only and is included to show an example of nearby vehicles within range to communicate with the host vehicle 100A and/or provide desirable sensor data for supplementing or maintaining sensor data of the host vehicle 100A. The operating range 110A could be made smaller to include less support vehicles or be made larger to include more support vehicles such as 20, 50, or n-number of support vehicles.

As will be discussed below, the one or more support vehicles 100B may be mapped using Global Navigation Satellite Systems (GNSS), Vehicle-to-Everything (V2X), and/or Ultra-Wideband (UWB), for example. As introduced above, each support vehicle 100B may be identified with the heading 108B which is representative of the front of one of the one or more support vehicles 100B. The heading 108B may be used to calculate an angle between the heading 108A of the host vehicle 100A and the heading 108B of each of the one or more support vehicles 100B to determine a relative position of each of the one or more support vehicles 100B and the host vehicle 100A. The map of the one or more support vehicles 100B may be continuously updated as support vehicles 100B enter and/or leave the operating region 110A of the host vehicle 100A.

Figure 6:
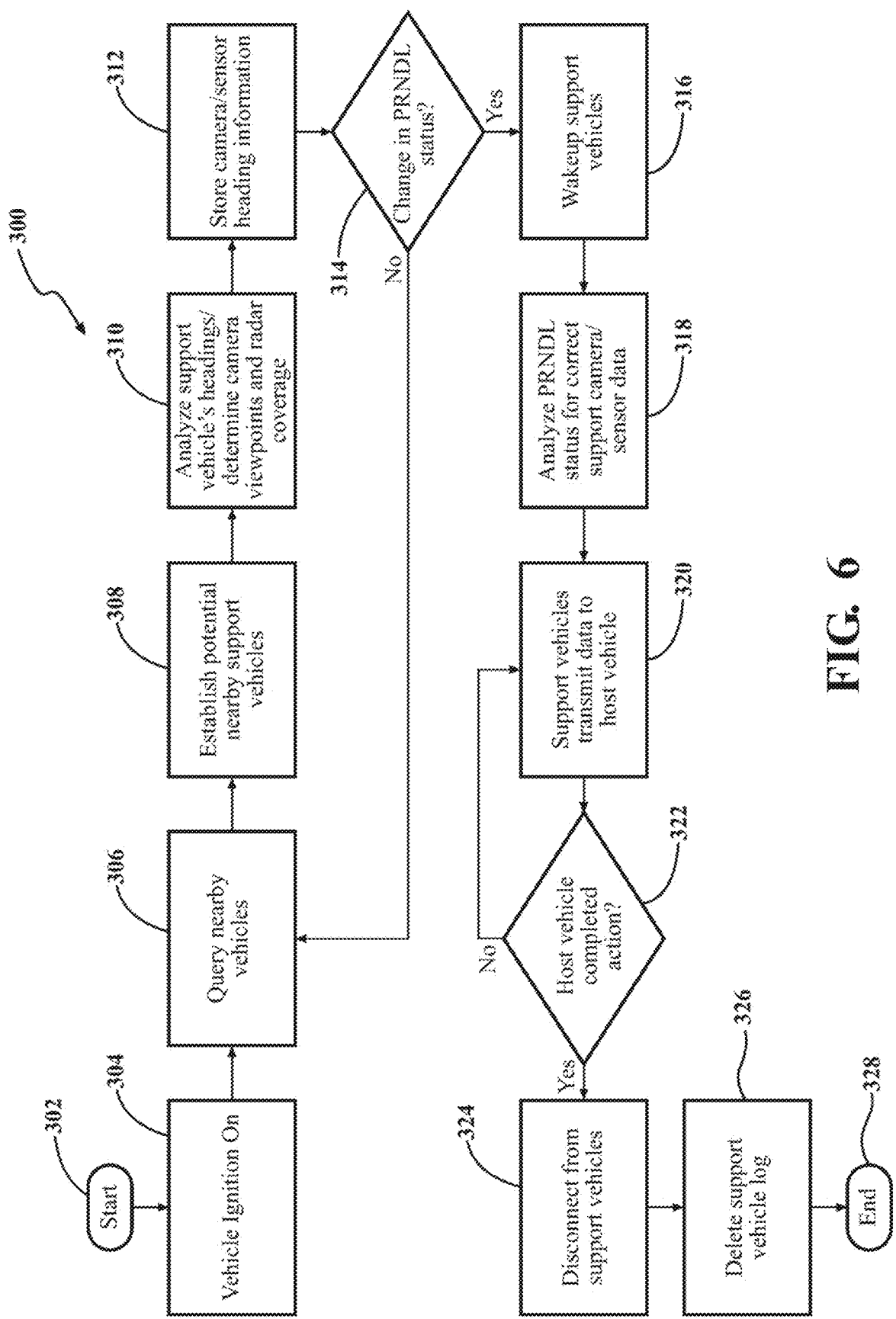
FIG. 6 is a flowchart detailing a method of maintaining sensor data of the host vehicle with sensor data of the one or more support vehicles.

With continued reference to FIG. 6, the gear status of the host vehicle 100A may be utilized, among other conditions, to determine which of the support vehicles 100B should be alerted or woken up from a sleep mode in order to help maintain the sensor data of the host vehicle 100A. For instance, if the gear status of the host vehicle 100A is Reverse, Drive, or Low; then the host vehicle 100A may wake up the support vehicle 100B in regions I, III, and IV and simultaneously receive sensor data therefrom. More specifically, when the gear status of the host vehicle 100A is Drive or Low, the host vehicle 100A may supplement or maintain its sensor data with sensor data of rear sensors of the support vehicles 100B in region I and sensor data of front sensors of the support vehicles 100B in regions III and IV. If the gear status of the host vehicle 100A is Reverse then the host vehicle 100A may wake up the support vehicles in regions II, III, and IV and simultaneously receive sensor data therefrom. More specifically, when the gear status of the host vehicle 100A is in Reverse, the host vehicle 100A may supplement or maintain its sensor data with sensor data of rear sensors of the support vehicles 100B in regions III and IV and front sensors of the support vehicles 100B in region II.

With reference to FIG. 6, a method for maintaining sensor data of the host vehicle 100A with sensor data of one of the one or more support vehicles 100B is provided. At a first step, 302, the method 300 is initiated. In practical terms, the method 300 may be initiated at step 304 upon powering up of the host vehicle 100A by the vehicle operator. At step 306, the vehicle management system 16 begins to query one or more support vehicles 100B, which may include using one or more wireless communication technologies such as Global Navigation Satellite Systems (GNSS), Vehicle-to-Everything (V2X), and/or Ultra-Wideband (UWB), etc.

At step 308, a map of one or more support vehicles 100B adjacent or within the operating region of the host vehicle 100A is established.

At step 310, available sensor support of the one or more support vehicles 100B is determined. Determining available sensor support of the one or more support vehicles 100B may include identifying the heading 108B of each of the one or more support vehicles, determining camera viewpoints of each of the one or more support vehicles, and determining radar coverage of each of the one or more support vehicles.

At step 312, the data concerning the one or more support vehicles 100B may be stored in the memory hardware 52 on-board the host vehicle 100A and/or in the remote memory hardware 76 of the off-board cloud computing system 20.

At step 314, the communication system 18 determines whether there has been a change in a gear status of the host vehicle 100A. Alternatively, if the driver interface device 24 is coupled to the network connection interface 34, a signal may be sent from the driver interface device 24 to the communication device 18 when the operator changes gears from park to reverse, for example. If, on the other hand, the communication device 18 has not received a signal which indicates that the driver has changed gears, whether it be directly from the driver interface device 24 or from the network connection interface 34, then the method 300 returns to step 306 and queries for one or more support vehicles adjacent or within the operating range of the host vehicle 100A. In practical terms, while the host vehicle 100A is parked, the host vehicle 100A may maintain connection with one or more support vehicles 100B which were already mapped in step 308 while also supplementing the vehicle map with new and/or replacement support vehicles that enter an area adjacent or within the operating range 110A of the host vehicle 100A.

At step 316, the host vehicle 100A communicates with the one or more support vehicles 100B to wake up the one or more support vehicles 100A from a sleep mode.

At step 318, depending on the gear status of the host vehicle (i.e., Park, Reverse, Neutral, Drive, Low), the host vehicle 100A may either request sensor specific data from the one or more support vehicles 100B to maintain the sensor data of the host vehicle 100A, as described above with respect to FIG. 5. Additionally, the host vehicle 100A may continuously receive any and all sensor data from all of the one or more support vehicles and maintain its sensor data according to the gear status of the host vehicle 100A.

At step 320, as the host vehicle 100A begins to change position (e.g., reverse out of a parking spot) the one or more support vehicles 100B continue to transmit and/or send data which is received at the host vehicle 100A.

At step 322, once the host vehicle 100A has stopped changing position, the one or more support vehicles 100B will stop sending sensor data to the host vehicle 100A. However, the method 300 will return to step 320 while the host vehicle 100A remains in motion.

At step 324, once the host vehicle 100A has stopped changing positions, the host vehicle 100A will disconnect from the one or more support vehicles 100B.

At step 326, the data gathered from the one or more support vehicles 100B may be deleted from the memory hardware 52, 76, whether on-board or off-board, of the host vehicle 100A.

Finally, the method 300 ends at step 328.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, cause the data processing hardware to perform operations comprising:
    establishing a map of one or more support vehicles adjacent to a host vehicle including calculating an angle between a heading of the host vehicle and a heading of each of the one or more support vehicles to determine a relative position of each of the one or more support vehicles and the host vehicle;
    determining available sensor support of the one or more support vehicles;
    storing the available sensor support in memory hardware connected to the host vehicle;
    determining whether there has been a change in a gear status of the host vehicle;
    receiving sensor data from the one or more support vehicles;
    maintaining sensor data of the host vehicle with the sensor data of the one or more support vehicles based on the gear status of the host vehicle;
    maintaining a connection with the one or more support vehicles; and
    waking up the one or more support vehicles from a sleep mode when there has been a change in gear status of the host vehicle.

2. The method of claim 1, wherein establishing a map of the one or more support vehicles comprises querying the one or more support vehicles using one or more vehicle communication networks.

3. The method of claim 1, wherein determining the available sensor support of the one or more support vehicles comprises:
 identifying a heading of each of the one or more support vehicles;
 determining camera viewpoints of each of the one or more support vehicles; and
 determining radar coverage of each of the one or more support vehicles.

4. The method of claim 1, wherein the memory hardware connected to the host vehicle is a cloud-based memory system.

5. The method of claim 1, wherein maintaining the sensor data of the host vehicle comprises continuously receiving data from the one or more support vehicles as the host vehicle changes position with respect to the one or more support vehicles.

6. A system comprising:
 data processing hardware; and
 memory hardware in communication with the data processing hardware, the memory hardware storing instructions that, when executed on the data processing hardware, cause the data processing hardware to perform operations comprising:
  establishing a map of one or more support vehicles adjacent to a host vehicle including calculating an angle between a heading of the host vehicle and a heading of each of the one or more support vehicles to determine a relative position of each of the one or more support vehicles and the host vehicle;
  determining available sensor support of the one or more support vehicles;
  storing the available sensor support in the memory hardware connected to the host vehicle;
  determining whether there has been a change in a gear status of the host vehicle;
  receiving sensor data from the one or more support vehicles;
  maintaining sensor data of the host vehicle with the sensor data of the one or more support vehicles based on the gear status of the host vehicle;
  maintaining a connection with the one or more support vehicles; and
  waking up the one or more support vehicles from a sleep mode when there has been a change in gear status of the host vehicle.

7. The system of claim 6, wherein establishing a map of the one or more support vehicles comprises querying the one or more support vehicles using one or more vehicle communication networks.

8. The system of claim 6, wherein determining the available sensor support of the one or more support vehicles comprises:
 identifying a heading of each of the one or more support vehicles;
 determining camera viewpoints of each of the one or more support vehicles; and
 determining radar coverage of each of the one or more support vehicles.

9. The system of claim 6, wherein the memory hardware connected to the host vehicle is a cloud-based memory system.

10. The system of claim 6, wherein maintaining the sensor data of the host vehicle comprises continuously receiving data from the one or more support vehicles as the host vehicle changes position with respect to the one or more support vehicles.

11. A vehicle management system comprising:
 a communication system,
 data processing hardware; and
 memory hardware in communication with the data processing hardware, the memory hardware storing instructions that, when executed on the data processing hardware, cause the data processing hardware to perform operations comprising:
 establishing a map of one or more support vehicles adjacent to a host vehicle including calculating an angle between a heading of the host vehicle and a heading of each of the one or more support vehicles to determine a relative position of each of the one or more support vehicles and the host vehicle;
 determining available sensor support of the one or more support vehicles, comprising the steps of:
  identifying a heading of each of the one or more support vehicles,
  determining camera viewpoints of each of the one or more support vehicles, and
  determining radar coverage of each of the one or more support vehicles;
 storing the available sensor support in memory hardware connected to the host vehicle;
 determining whether there has been a change in a gear status of the host vehicle;
 receiving sensor data from the one or more support vehicles;
 maintaining sensor data of the host vehicle with the sensor data of the one or more support vehicles based on the gear status of the host vehicle;
 maintaining a connection with the one or more support vehicles; and
 waking up the one or more support vehicles from a sleep mode when there has been a change in gear status of the host vehicle.

12. The vehicle management system of claim 11, wherein the memory system connected to the host vehicle is a cloud-based memory system.

13. The vehicle management system of claim 11, wherein maintaining the sensor data of the host vehicle comprises continuously receiving data from the one or more support vehicles as the host vehicle changes position with respect to the one or more support vehicles.

14. The vehicle management system of claim 11, wherein the memory hardware connected to the host vehicle is a cloud-based memory system.

* * * * *